United States Patent [19]

Bellinghausen

[11] Patent Number: 4,599,656

[45] Date of Patent: Jul. 8, 1986

[54] PROCESSING OF GRAY SCALE IMAGE PELS TO FACILITATE DATA COMPRESSION

[75] Inventor: Joan M. Bellinghausen, Chapel Hill, N.C.

[73] Assignee: International Business Machines Corporation, Armonk, N.Y.

[21] Appl. No.: 581,768

[22] Filed: Feb. 21, 1984

[51] Int. Cl.[4] .................... H04N 1/40; H04N 1/419
[52] U.S. Cl. .................... 358/261; 358/280; 358/284
[58] Field of Search .................... 382/50, 52, 54, 56; 358/166, 284, 260, 261, 280, 21 R, 36, 167

[56] References Cited

U.S. PATENT DOCUMENTS

| | | | |
|---|---|---|---|
| 4,280,144 | 7/1981 | Bacon | 358/280 |
| 4,498,104 | 2/1985 | Schulz | 382/54 |
| 4,504,864 | 3/1985 | Anastassiou et al. | 358/36 |
| 4,532,651 | 7/1985 | Pennebaker, Jr. et al. | 358/284 |

Primary Examiner—Joseph A. Orsino, Jr.
Attorney, Agent, or Firm—Gerald R. Woods

[57] ABSTRACT

A process is described for identifying those pels in a gray scale image which are candidates for vertical filtering before the image is thresholded to binary or black/white pel values. The vertical neighbor pels of a pel below a run end point are examined to determine whether their gray scale values fall within the same range. If they do, the horizontal neighbors of the current pel are examined to see whether their gray scale values fall in different ranges. If they do, the pel is vertically filtered by adjusting its gray scale value as a function of the differences between its value and the values of its vertical neighbors. Because only selected pels are vertically filtered, the process can be carried out with a general purpose microprocessor rather than a special purpose parallel processor.

5 Claims, 12 Drawing Figures

FIG.1

|    | C1  | C2 |
|----|-----|----|
| R1 | 190 | 0  |
| R2 | 120 | 0  |
| R3 | 200 | 0  |

FIG. 3

|    | C1 | C2 |
|----|----|----|
| R1 | 1  | 0  |
| R2 | 0  | 0  |
| R3 | 1  | 0  |

|    | C1  | C2 |
|----|-----|----|
| R1 | 190 | 0  |
| R2 | 133 | 0  |
| R3 | 200 | 0  |

FIG. 10

|    | C1 | C2 |
|----|----|----|
| R1 | 1  | 0  |
| R2 | 1  | 0  |
| R3 | 1  | 0  |

PROCESSING OF GRAY SCALE IMAGE PELS TO FACILITATE DATA COMPRESSION

BACKGROUND OF THE INVENTION

The present invention relates to image processing and more particularly to a method for processing gray scale pel values to facilitate subsequent data compression.

Because travel costs are rising and because a traveler's time in transit can seldom be used productively, there is an increasing interest in the use of teleconferencing as an alternative to face to face business meetings between people from different locations. In a typical teleconferencing system, people in different cities or even different countries meet in special teleconferencing rooms at their respective home locations. Each room normally includes a room camera for capturing a wide angle view of the people, a document camera which can be focused on letters, drawings or other documents, a room monitor for permitting people in one room to see those in the other, and a document monitor for viewing documents being presented in the other room. Communications between the two rooms are established over conventional teleprocessing links, such as leased or switched telephone lines or satellite communication channels.

To reduce communication costs, freeze-frame teleconferencing techniques may be employed. The video image captured by a room camera is updated only periodically, either at fixed intervals or on command of an operator. People at the receiver see the same "frozen" room image between updates. Audio signals are transmitted on a real time basis so that there is no perceptible delay in voice communications. Document images are updated only when the person presenting a document pushes a "send" button in the teleconferencing room.

After a "send" button is pushed, the image of the presented document does not appear immediately on the display or monitor in the receiving teleconferencing room. A finite period of time is required to scan, capture and process image data at the originating teleconferencing room, to transmit the processed data over teleprocessing links and to process data at the receiving teleconferencing room in order to reconstruct the image of the presented document. The length of the delay can be critical in a teleconferencing system. Delays exceeding a few seconds produce unnatural pauses in the smooth flow of a business meeting.

The length of the delay is directly related to the amount of data which must be transmitted in order to construct an acceptable video image at the receiving teleconferencing room and is inversely related to the bandwidth of the teleprocessing link over which the data must be transmitted. Delay can be reduced by using a higher bandwidth channel. However, communication costs are a direct function of required bandwidth making it desirable to utilize low bandwidth links; e.g., conventional telephone lines.

Delay time and communication costs can be reduced by compressing the amount of data which must be transmitted over a low bandwidth channel in order to reconstruct an acceptable video image of a presented document. For example, documents which are nominally bilevel (for example, black characters on white paper) can be digitized by assigning a one bit binary value, representing black or white, to each picture element or pel in the image captured by the camera. The binary data can then be compressed using known one-dimensional or two-dimensional run length encoding techniques.

Another technique for achieving greater reductions in delay time and communication costs is to reduce the image sampling rate. Instead of sampling the image at 40 picture elements or pels per inch, the sampling rate may be reduced to 20 or even 10 pels per inch. The amount of data which must be encoded and transmitted is directly related to the sampling rate.

However, video images captured at reduced sampling rates can become distorted. One type of distortion that can occur is along a vertical edge of an image area; for example, along a vertical edge of the stem in a typed or printed "T". What may appear, at a distance, as a perfectly straight edge will turn out to have irregularities on closer inspection. Depending upon the relative orientation of the sampling pel positions and the vertical edge, simply reducing the image pels to one bit binary values may cause the irregularities to be accentuated, thus degrading the recreated video image.

To avoid image degradation along vertical edges, vertical filtering may be performed to reduce pel-to-pel variations in a vertical direction. According to one known technique, the digital value of substantially every pel in the image is modified as a function of the captured digital values for both of its vertical neighbors; that is, the pels above and below the pel being modified or filtered. If the vertical neighbor pels have higher digital values than the pel being filtered, the digital value of the pel is increased. Conversely, if the digital values for the vertical neighbor pels are lower, the digital value of the pel being filtered is reduced.

While the results achieved by this technique are satisfactory, the problem is that a special purpose parallel processor must be provided. Without such a processor, the time required for image processing is significantly increased since substantially every pel is being filtered. The parallel processor adds undesirable cost to a teleconferencing system.

SUMMARY OF THE INVENTION

The present invention is a method for vertically filtering only selected pels in a captured video image. The number of pels actually filtered is greatly reduced, making it possible to perform image processing without a special purpose parallel processor.

The method identifies pels which may require vertical filtering to reduce distortion due to sampling along image vertical edges and comprises the steps of retrieving the captured gray scale pel values for a current pel and for both pels which are vertical neighbors of the current pel. Each vertical neighbor pel is assigned one of the limited number of gray scale range values as a function of its captured gray scale value; that is, each vertical neighbor pel is assigned an intermediate threshold level. The intermediate threshold levels of the vertical neighbor pels are compared. If both have the same value, the current pel is identified as a candidate for vertical filtering.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

TECHNICAL DESCRIPTION

Figure 1:
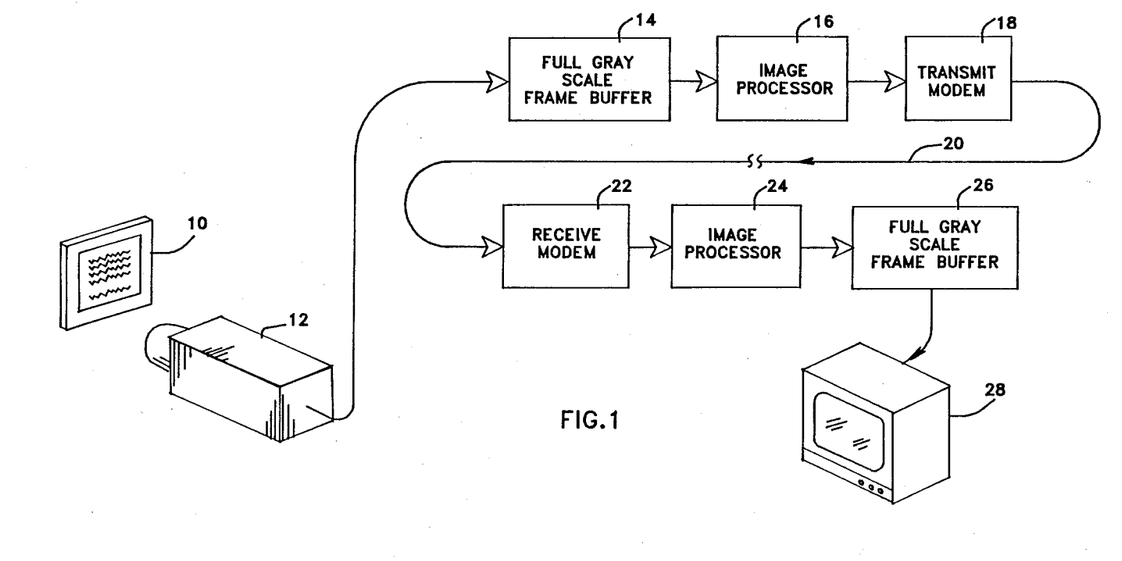
FIG. 1 is a simplified block diagram of the essential components of a teleconferencing system in which the present invention may be utilized.

Referring to FIG. 1, the method to be described below is employed in conjunction with those components of a teleconferencing system used to capture, process, transmit and display images of nominally bi-level documents, such as document 10. A conventional low resolution gray scale video camera 12 is used to scan the document 10. Each picture element or pel in the captured image is initially stored in a frame buffer 14 in the form of an N-bit word where N is dependent upon the gray scale resolution of the camera. If the camera 12 is capable of discriminating among 256 levels of gray, each pel stored in frame buffer 14 can be represented by an 8 bit binary word. The 8 bit word is referred to as the capture gray scale value of the pel. The capture gray scale value for any given pel can fall anywhere within the range of 0 to 255 with 0 being a pel in an ideal, pure black area and 255 being a pel in an ideal, pure white area.

The capture gray scale pel data is manipulated and compressed in an image processor 16 before being made available to a transmit modem 18. The modem 18 transmits the compressed data over a teleprocessing link 20, such as a dial-up telephone line, to a receive modem 22 at the receiving teleconferencing location. The compressed data is decompressed in an image processor 24 before being loaded into another gray scale frame buffer 26. The gray scale pel data stored in buffer 26 is used to drive the video display monitor 28.

The present invention is a method which would be carried out in the image processor 16, which could be driven by any suitable general purpose microprocessor such as a Type 68000 microprocessor available from Motorola Corporation.

Figure 2:
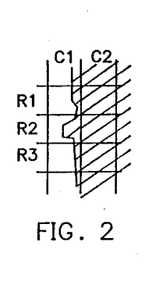
FIG. 2 is an enlarged view of a vertical edge of an image area with a grid of sampling pels.

Referring to FIG. 2, the vertical edge of an image area is shown with an overlay of pel boundaries or sampling regions. Those pels in the shaded area to the right of the vertical edge are assumed to have an ideal 0 value. Those pels to the left of the edge are assumed to have an ideal value of 255. The pels on the vertical edge will have values falling between these extremes depending upon the relative amounts of black and white areas within the pel boundary.

Figure 3:
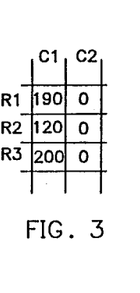
FIGS. 3 through 5 represent the various steps of compressing the image of FIG. 2 but without vertical filtering.
Figure 4:
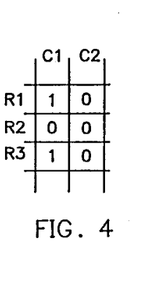

FIG. 3 is a matrix of capture gray scale values for the area shown in FIG. 2. In these two figures as well as in FIGS. 4, 5, 10, 11 and 12, particular pels are referenced by row and column coordinates. The pels at R1, C1 and R3, C1 will have nearly the same capture gray scale value since both have the same relative amounts of black and white area. The pel at R2, C1 will, on the other hand, have a much lower capture gray scale value due to the excursion of the black area toward the left. Such an excursion might occur on a nominally straight edge due to ink migration or smudging. The capture gray scale value shown in FIG. 3 could be thresholded immediately to binary levels simply by defining any pel having a gray scale value of 128 or higher as a 1 and any pel having a value lower than 128 as a 0. The result of this rudimentary thresholding approach is shown in FIG. 4.

Figure 5:
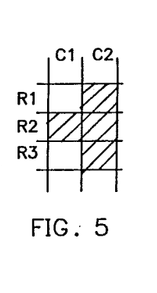

If the binary data obtained through such rudimentary thresholding were to be transmitted and used as is, the recreated image would follow the pattern shown in FIG. 5. Note that the pel at R2, C1 would be recreated as a black pel since its capture gray scale value of 120 is slightly below the threshold level of 128. The distortion is accentuated by the fact that the pels at R1, C1 and R3, C1 will be recreated as white pels since their capture gray scale values are greater than the threshold value of 128.

To minimize the kind of distortion which can be seen in FIG. 5, vertical filtering is employed. Vertical filtering is described in considerably more detail with reference to later figures. Basically, however, a pel is vertically filtered by looking at the capture gray scale value of the pels immediately above and below; that is, its vertical neighbor pels. If the vertical neighbor pels both have capture gray scale values greater than the pel being filtered, the gray scale value of that pel is increased. Conversely, if the vertical neighbor pels have lower gray scale values, the gray scale value of the pel being filtered is reduced. Binary thresholding, along with other image processing operations, can then be performed using the new or filtered gray scale value for the pel.

Figures 6, 7:
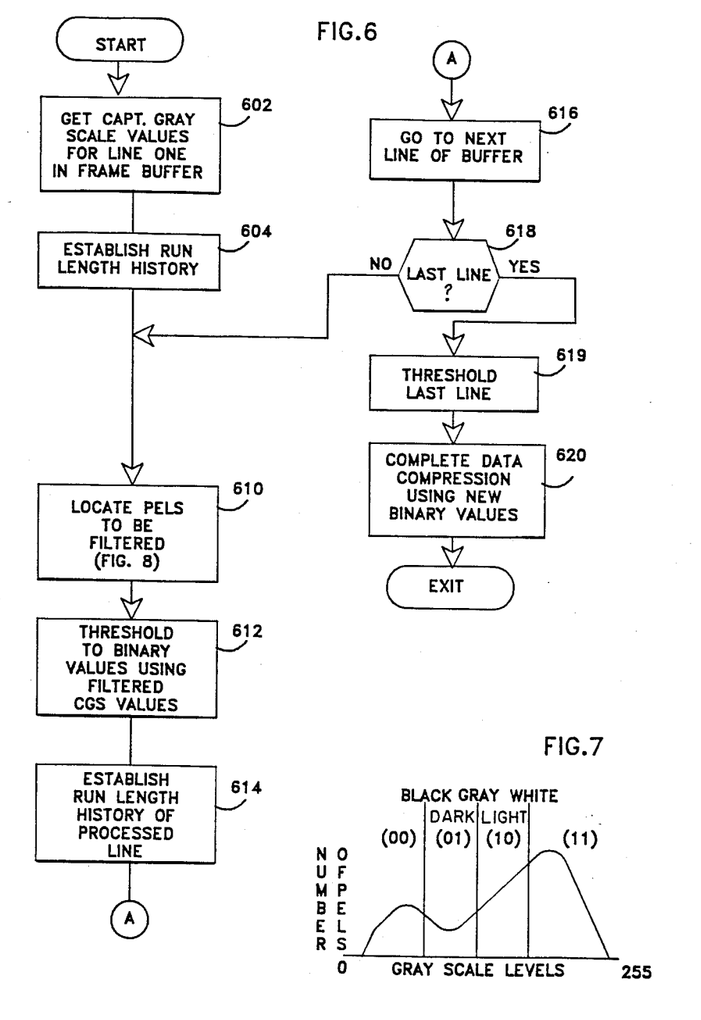
FIG. 6 is a flow chart of an overall image processing operation within which the present invention may be practiced.
FIG. 7 is a histogram which shows the intermediate threshold boundaries which are used in a preferred embodiment of the present invention.

Referring to FIG. 6, a number of image processing operations precede and follow the vertical filtering operation. FIG. 6 is a high level flow chart of the preceding and following operations. In the first of the preliminary steps (602) the capture gray scale values for all pels in line 1 of the image are retrieved from the frame buffer. These gray scale values are thresholded to binary levels using the simple fixed threshold mentioned above or other more complex thresholding arrangements. The thresholding technique employed is not part of this invention and is not described in detail. Line 1 is run length encoded (604) to establish a run length history. Run length encoding is well known. Rather than store a binary value for each pel on a line, all that is stored is the length of each run of pels. For example, if a line at a run of 25 white pels followed by ten black pels, followed by 30 white pels, etc., the run length history would be represented by the following string of numbers 26, 36, 66 where each number is the location of the first pel in a new run.

To determine whether a pel on the current line is a candidate for vertical filtering, a processor uses the run length history of the prior line to examine only those pels of the current line which are immediately below the beginning and end of each run in the prior line. The actual steps used to locate pels to be filtered are discussed with reference to FIG. 8. For purposes of FIG. 6, these steps are represented as a single block 610. When the selected pels have been identified and filtered to establish new or filtered gray scale values, these values are used to threshold each pel in the current line to binary values (612).

The new gray scale values are used in creating a run length history (614) for the current line.

When the run length history for the current line has been established, the process continues (616) at the next line of the buffer. Unless the next line is the last line (618) of the frame buffer, the loop consisting of operations 610, 612, 614, 616 is repeated. If, however, the next line is the last line (618) of a frame buffer, it cannot be vertically filtered but instead is thresholded to a binary level (619) using the original gray scale values.

Further data compression (620), such as conventional two-dimensional run length compression can be performed in parallel with the steps described above using the thresholded or final binary values so that all data compression is completed on one pass through the frame buffer.

The specific steps performed to identify pels for vertical filtering are described with reference to FIG. 8. Several of these steps involve an intermediate thresholding operation in which certain pels are assigned one of four ranges of gray scale values as a function of their original capture gray scale values. The intermediate threshold steps require a histogram of the captured image. A histogram is basically a graph showing how many pels have each of the 256 possible capture gray scale values. The irregular line in FIG. 7 shows a typical histogram for a heavily printed document having black characters on a white background. The programming steps required to generate a histogram are simple and well known. Since construction of a histogram is not part of the present invention, those steps are not described here.

When the histogram has been constructed, a WHITE boundary is established preferably at the median gray scale level. A BLACK boundary is established at the gray scale level half way between the WHITE boundary and the lowest level in the histogram: A GRAY boundary is established at the level midway between the BLACK and WHITE boundaries.

As is explained in more detail below, certain pels are temporarily assigned one of four possible two-bit values as a function of their capture gray scale value. Any pel having a capture gray scale value less than the value at the BLACK boundary is assigned a binary value of 00. Any pel with a gray scale value between the BLACK and GRAY boundaries is considered a dark gray pel and is assigned a value of 01. Each pel with a value between the GRAY and WHITE boundary is considered light gray pel and is assigned a binary value of 10. Each pel having a capture gray scale value greater than the value at the WHITE boundary is considered to be a white pel and is assigned a binary value of 11.

Figure 8:
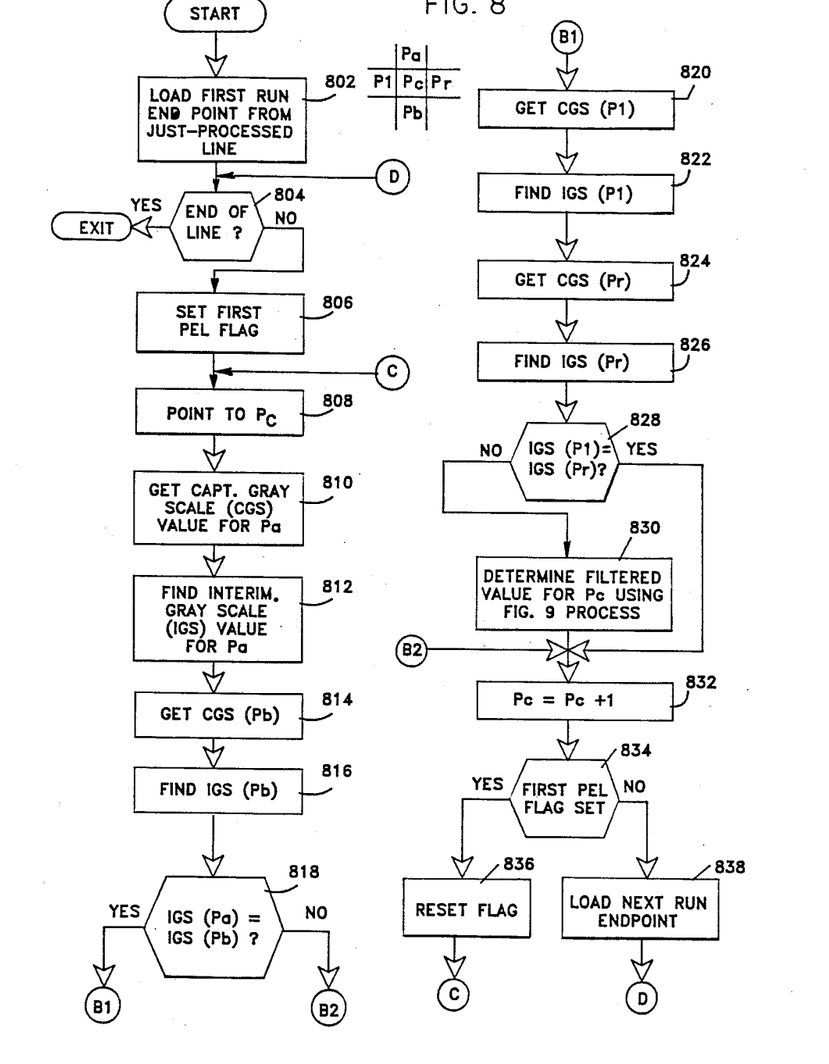
FIG. 8 is a more detailed flow chart of the steps which are required to identify pels requiring vertical filtering.

Referring to FIG. 8, the process of identifying those pels which require vertical filtering begins with the step (802) of locating the first pel below a run end point of the prior or history line. This pel, identified as the current pel, is at the first possible vertical edge in the current line. A check is then made (804) as to whether the current pel is at the end of the scan line. If it is, no vertical filtering is needed and control is returned to operation 614 in the process described with reference to FIG. 6.

Assuming, however, that the current pel is not at the end of the line, a First Pel flag is set (806). Both the current pel and the next pel must be independently tested and, if need be, independently filtered. The First Pel flag is an indication that the first of these two pels is being processed. After pointing to the current pel Pc (808) the capture gray scale value for the pel Pa immediately above pel Pc is retrieved (810) and an interim gray scale value for pel Pa is assigned (812) through the use of the intermediate thresholding scheme described with reference to FIG. 7. The captured gray scale value for Pb, the pel below the current pel, is retrieved (814) and an intermediate gray scale value is assigned (816).

A check is then made as to whether pels Pa and Pb, the vertical neighbor pels for the current pel, have the same intermediate gray scale value (818). If the vertical neighbor pels have different intermediate gray scale values, the current pel is not a candidate for vertical filtering. If this pel is not a candidate, the program branches to operation 832, the first operation needed to test the next pel, which then is treated as the current pel.

Assuming, however, that the test in operation 818 shows that the vertical neighbor pels have the same intermediate gray scale value, a second test must still be performed on the current pel. The capture gray scale value for the pel to the left of the current pel is retrieved (820) and an intermediate gray scale value is assigned to this pel Pl (822). The capture gray scale for the pel Pr to the right of the current pel is also retrieved (824) and an intermediate gray scale value is assigned (826) for pel Pr. A check is then made (828) to determine whether these horizontal neighbor pels, have the same intermediate gray scale value. If the horizontal neighbor pels have the same intermediate gray scale value, the current pel may not be on an image vertical edge but rather on a generally horizontal line, which is one pel in width. Vertical filtering is not desirable in this situation since it might increase image distortion rather than remove it. Therefore, if the horizontal neighbor pels have the same intermediate gray scale value, no vertical filtering is performed, notwithstanding the test performed on vertical neighbor pels was satisfied.

Assuming the horizontal neighbor pels do have different intermediate gray scale values, however, then the current pel is identified as requiring vertical filtering. The actual steps of finding the filter gray scale value FGS for the current pel Pc will be described with reference to FIG. 9 and are represented in FIG. 8 in the form of a single block 830.

Once the necessary filtering has been performed or if the decisions made at blocks 818 and 828 indicate that no vertical filtering is to be performed on the current pel, the program increments the current pel location by 1 to point to the next pel. A check is then made as to whether the First Pel flag is set (834). If the flag is set, indicating that only the first of the two pels has been tested, the flag is reset (836) and the entire process is repeated for the next pel.

When the next pel, now identified as the current pel, has been processed in the series of operations beginning with operation 808 and ending with operation 832, operation 834 will be repeated. This time the First Pel flag will be reset. Under these conditions, the next run end point in the history line is found (838) to restart the process of identifying any pel at this end point which may require vertical filtering.

With the exception of the last line, the pel identification process described with reference to FIG. 8 is repeated for pels below the run end points in every history line of the frame buffer, in accordance with the steps described with reference to FIG. 6.

Figure 9:
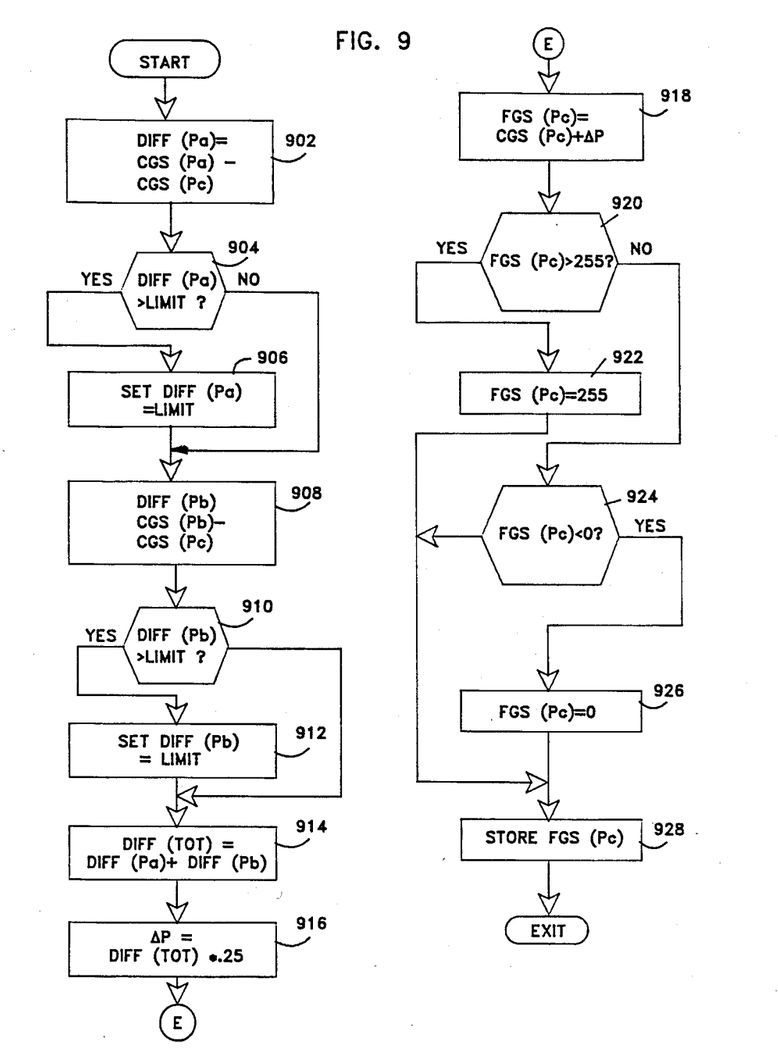
FIG. 9 is a detailed flow chart of the actual vertical filtering process for identified pels.

The actual vertical filtering steps, referred to only as block 830 in FIG. 8, are described in detail with reference to FIG. 9. The first step (902) in the actual vertical filtering process is to establish the difference in gray scale values between the current pel Pc and the pel Pa through simple subtraction. A check is then made (904) to determine whether the difference exceeds the predetermined limit. If the difference is greater than the limit, it is set equal to the limit (906). If not, the original value of the difference is retained. The difference between the pel Pb and current pel Pc is then established (908) in the same way and a check (910) is made to determine whether this difference exceeds the limit. If it does, this difference is set equal to the limit (912). If it doesn't, the original difference is retained.

The sum of the two differences is determined (914) and a filter value $\Delta P$ is obtained by multiplying the total difference times a scale factor (916). A scale factor of 0.25 has empirically been found to be preferred. The gray scale value for the current pel is adjusted (918) by the value $\Delta P$. It should be noted that value of $\Delta P$ may not directly reflect the actual gray scale values of the current pel and its vertical neighbor pels which can occur in steps 904, 906, 910 and 912. The reason for limiting is to preserve any sharp transitions which exist in the image.

After the gray scale value of the current pel has been adjusted by the filter value $\Delta P$, a check is made (920) to see whether the calculated new value for the current pel exceeds 255. Where 8 bit words are used to store the initial or capture gray scale values, the maximum pel gray scale value must, of course, be limited to 255 (922). If the calculated value does not exceed 255, another check (924) is made to determine whether it is less than 0, which is also a physical impossibility. If the results of the calculation did yield a negative gray scale value, the value is limited to 0 (926). The new or filtered gray scale value for the current pel Pc is stored (928) before program control is returned to operation 832 in the process described with reference to FIG. 8.

Figure 10:
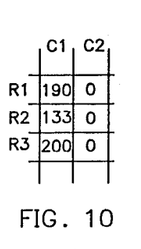
FIGS. 10 through 12 represent various stages of compressing the image represented by FIG. 2 where selected pels are vertically filtered.
Figure 11:
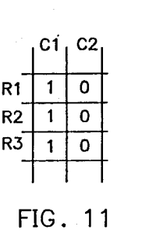
Figure 12:
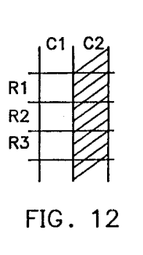

FIGS. 10 through 12 show the results of vertical filtering as applied to the image shown in FIG. 2 and digitized in FIG. 3. Referring to FIG. 3 momentarily, and taking the pel at R2, C1 as the current pel, it will be seen that this pel is a candidate for vertical filtering. The vertical neighbor pels at R1, C1 and R3, C1 have substantially the same gray scale value and would undoubtedly be assigned the same intermediate gray scale value in the steps performed in the process described with reference to FIG. 8. The horizontal neighbor pels, on the other hand, have completely different values so that all tests required by the steps in FIG. 8 are satisfied. The pel at R2, C1, would definitely be a candidate for vertical filtering.

Applying the vertical filtering process described with reference to FIG. 9, the difference between the pel above the current pel and the current pel would be 190 minus 120 or 70. Assume that the limit discussed with reference to FIG. 9 is arbitrarily set at 25 pels, this difference would be limited to a value of 25. Similarly, the difference between the lower horizontal neighbor and the current pel would be 200 minus 120 or 80 and would also be limited to 25. The total difference would thus be 25 plus 25 or 50 and $\Delta P$ would 50 times 0.25 or, with rounding, 13. When the raw or capture gray scale value for the current pel is adjusted by $\Delta P$, the gray scale value increases from 120 to 133. If a simple binary thresholding step is performed in which all pels with gray scale values greater than 128 are classified as white, the change in gray scale value of the pel R2, C1 due to vertical filtering is enough to cause the pel to be as white rather than black. This is indicated in the binary value shown in FIG. 11 and in the image shown in FIG. 12. It will be noted that the vertical filtering eliminates the black "bump" which can be seen in the same pel location in the FIG. 5 representation of a thresholded, but unfiltered, image.

While there has been described what is considered to be a preferred embodiment of the invention, variations and modifications therein will occur to those skilled in the art. For example, the technical description uses the term "capture" gray scale value in a number of places. This term is not to be construed as meaning only those values resulting from direct digitization of a camera-generated analog signal. The term also contemplates any gray scale values which might be generated when preliminary image processing operations are performed. An example of such an operation is a deshading operation which eliminates subtle differences in background (usually white) pel values due to non-uniform lighting, document curl, etc.

Therefore, it is intended that the appended claims shall be construed to include both the preferred embodiment and all such variations and modifications as fall within the true spirit and scope of the invention.

I claim:

1. For use in an image processing system of the type wherein capture gray scale pel values are to be thresholded to binary values to facilitate subsequent data compression, a method for identifying a pel which may require filtering to reduce distortion due to sampling along image vertical edges, said method comprising the steps of:
   retrieving capture gray scale pel values for a current pel and for both pels which are vertical neighbors of the current pel;
   assigning each vertical neighbor pel one of a limited number of gray scale range values as a function of the capture gray scale value of the pel;
   identifying, as a filtering candidate, any current pel having vertical neighbors with the same assigned value;
   retrieving capture gray scale pel values for both pels which are horizontal neighbors of each candidate current pel;
   assigning each horizontal neighbor pel one of a limited number of gray scale range values as a function of the capture gray scale value of the pel; and
   finally selecting, for filtering, each candidate current pel having horizontal neighbors with different assigned values.

2. A method for vertically filtering any current pel identified by the steps of claim 1 comprising the additional step of adjusting the gray scale value of any identified current pel as a function of the relative gray scale values of the identified current pel and each of its vertical neighbors.

3. A method for vertically filtering identified current pels as set forth in claim 2 comprising the steps of:
   establishing the difference in capture gray scale values of the current pel and its upper vertical neighbors;

establishing the difference in capture gray scale value of the current pel and its lower vertical neighbor;

adjusting the gray scale value of the current pel as a function of the established differences.

4. A method for compressing gray scale pel data, including data vertically filtered in accordance with claim 3, comprising the steps of:

assigning one of two binary values to each pel as a function of the filtered gray scale values of the identified current pels and the unfiltered gray scale values of all remaining pels; and run length compressing successive lines of pels.

5. For use in an image processing system of the type wherein capture gray scale pel values are to be thresholded to binary values to facilitate subsequent data compression, a method for processing selected pels which may require filtering to reduce distortion due to sampling along image vertical edges, said method comprising the steps of:

(a) capturing and storing gray scale pel values for an entire image field in a multi-line frame buffer;

(b) thresholding the stored gray scale pel values in the first image line to establish a run length history for that line;

(c) using the run length history of the prior line to locate the pel below a run endpoint;

(d) retrieving capture gray scale pel values for the located pel and for both pels which are vertical neighbors of the located pel;

(e) assigning each vertical neighbor pel one of a limited number of gray scale range values as a function of its capture gray scale value;

(f) identifying, as a filtering candidate, any located pel having vertical neighbors with the same assigned value;

(g) retrieving capture gray scale pel values for pels which are horizontal neighbors to each identified pel;

(h) assigning each horizontal neighbor pel one of a limited number of gray scale range values as a function of its capture gray scale value;

(i) vertically filtering any candidate pel having horizontal neighbor pels with different assigned values;

(j) repeating steps (d) through (i) for the pel to the right of the originally located pel;

(k) repeating steps (c) through (j) for the remaining run endpoints indicated by the run length history;

(l) thresholding the gray scale pel values for the just-processed line to establish a run length history for that line; and (m) repeating steps (c) through (k) using the just-established run length history for all image lines in the frame buffer except the last line.

* * * * *